US007369935B2

(12) United States Patent
Cesario et al.

(10) Patent No.: US 7,369,935 B2
(45) Date of Patent: *May 6, 2008

(54) SOFT-COMPUTING METHOD FOR ESTABLISHING THE HEAT DISSIPATION LAW IN A DIESEL COMMON RAIL ENGINE

(75) Inventors: Nicola Cesario, Casalnuovo di Napoli (IT); Claudio Muscio, Augusta (IT); Marco Farina, Pavia (IT); Paolo Amato, Limbiate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/527,012

(22) Filed: Sep. 25, 2006

(65) Prior Publication Data

US 2007/0021902 A1 Jan. 25, 2007

Related U.S. Application Data

(63) Continuation of application No. 11/142,914, filed on May 31, 2004, now Pat. No. 7,120,533.

(30) Foreign Application Priority Data

May 31, 2004 (EP) ................................ 04425398

(51) Int. Cl.
*G06F 17/00* (2006.01)
*G06F 7/00* (2006.01)

(52) U.S. Cl. ...................................... 701/106; 701/104

(58) Field of Classification Search ............... 73/23.31, 73/23.32, 35.03, 35.04, 112, 115, 117.3, 116; 123/435, 436, 478, 480, 486; 701/101-106, 701/109, 111, 114, 115

See application file for complete search history.

(56) References Cited

U.S. PATENT DOCUMENTS

| | | | | |
|---|---|---|---|---|
| 6,089,077 | A * | 7/2000 | Daniels | 73/35.03 |
| 6,952,923 | B2 * | 10/2005 | Branyon et al. | 123/70 R |
| 7,031,828 | B1 * | 4/2006 | Thompson et al. | 701/114 |
| 7,120,533 | B2 * | 10/2006 | Cesario et al. | 701/106 |
| 2005/0022789 | A1 * | 2/2005 | Palma et al. | 123/435 |

FOREIGN PATENT DOCUMENTS

| | | | |
|---|---|---|---|
| EP | 1363005 | A2 * | 11/2003 |
| JP | 11343916 | A * | 12/1999 |
| JP | 20000321176 | A * | 11/2000 |
| JP | 2001281328 | A * | 10/2001 |

* cited by examiner

*Primary Examiner*—Willis R. Wolfe, Jr

(74) *Attorney, Agent, or Firm*—Lisa k. Jorgenson; Bryan A. Santarelli; Graybeal Jackson Haley LLP

(57) ABSTRACT

A soft-computing method for establishing the dissipation law of the heat in a diesel Common Rail engine, in particular for establishing the dissipation mean speed (HRR) of the heat, includes the following steps:

choosing a number of Wiebe functions whereon a dissipation speed signal (HRR) of the heat is decomposed;

applying a Transform Ψ to the dissipation speed signal (HRR) of the heat;

carrying out analysis of homogeneity of the Transform Ψ output;

realizing a corresponding neural network MLP wherein the design is guided by an evolutive algorithm; and training and testing the neural network MLP.

22 Claims, 12 Drawing Sheets

| | |
|---|---|
| Type | Naturally Aspirated 4 Stroke Diesel Engine |
| Displacement | 224 $cm^3$ |
| Bore | 69 mm |
| Stroke | 60 mm |
| Compression Ratio | 17.5:1 |
| Fuel supply | Injection System Common Rail |
| Max Power | 3.5 kW @ 3600 rpm |
| Max Torque | 10.5 Nm @ 2200 rpm |

- driver request
- point of the upper bound torque map related to the same rpm
- point of the lower bound torque map related to the same rpm

| SOIPRE deg | Torque Nm | SOIPRE deg | Torque Nm | SOIPRE deg | Torque Nm | SOIPRE deg | Torque Nm | SOIPRE deg | Torque Nm | SOIPRE deg | Torque Nm | SOIPRE deg | Torque Nm |
|---|---|---|---|---|---|---|---|---|---|---|---|---|---|
| -29.06 | 7.74 | -26.06 | 8.09 | -23.03 | 8.82 | -20.05 | 8.83 | -17.05 | 8.66 | -14.08 | 8.84 | -11.07 | 8.73 |

| SOIPRE deg | Torque Nm | SOIPRE deg | Torque Nm | SOIPRE deg | Torque Nm | SOIPRE deg | Torque Nm | SOIPRE deg | Torque Nm | SOIPRE deg | Torque Nm | SOIPRE deg | Torque Nm |
|---|---|---|---|---|---|---|---|---|---|---|---|---|---|
| -29.06 | 8.87 | -26.03 | 9.13 | -23.06 | 9.45 | -20.06 | 9.53 | -17.08 | 9.51 | -14.06 | 9.33 | -8.06 | 8.89 |

SOFT-COMPUTING METHOD FOR ESTABLISHING THE HEAT DISSIPATION LAW IN A DIESEL COMMON RAIL ENGINE

PRIORITY CLAIM

This continuation application claims priority to U.S. application Ser. No. 11/142,914, now U.S. Pat. No. 7,120, 533, which claims priority from European patent application No. 04425398.7, filed May 31, 2004, both pf which are incorporated herein by reference.

TECHNICAL FIELD

The present invention relates generally to a soft-computing method for establishing the heat dissipation law in a diesel Common Rail engine, and relates in particular to a soft-computing method for establishing the heat dissipation mean speed (HRR).

More in particular, the invention relates to a system for realizing a grey box model, able to anticipate the trend of the combustion process in a Diesel Common Rail engine, when the rotation speed and the parameters characterizing the fuel-injection strategy vary.

BACKGROUND

For several years, the guide line relating to the fuel-injection control in a Diesel Rail engine has been the realization of a micro-controller able to find on-line, i.e., in real time while the engine is in use, through an optimization process aimed at cutting down the fuel consumption and the polluting emissions, the best injection strategy associated with the load demand of the injection-driving drivers.

Map control systems are known for associating a fuel-injection strategy with the load demand of a driver which represents the best compromise between the following contrasting aims: maximization of the torque, minimization of the fuel consumption, reduction of the noise, and cut down of the NOx and of the carbonaceous particulate.

The characteristic of this control is that of associating a set of parameters ($param_1, \ldots, param_n$) to the driver demand which describe the best fuel-injection strategy according to the rotational speed of the driving shaft and of other components.

The analytical expression of this function is:

$$(param_1, \ldots, param_n) = f(\text{speed, driver demand}) \quad (1)$$

The domain of the function in (1) is the size space $\infty^2$ since the rotational speed and the driver demand can each take an infinite number of values. The quantization of the speed and driverDemand variables (M possible values for speed and P for driverDemand) allows one to transform the function in (1) ($param_1, \ldots, param_n$) into a set of n matrixes, called control maps.

Each matrix chooses, according to the driver demand ($driverDemand_p$) and to the current speed value ($speed_m$), one of the parameters of the corresponding optimal injection strategy ($param_i$):

$$f^{(i)}_{m,p} = f^{(i)}(speed_m, driver_p) = param_i \quad (2)$$

where i=1, . . . , n, m=1, . . . , M e p=1, . . . , P

The procedure for constructing the control maps initially consists of establishing map sizes, i.e., the number of rows and columns of the matrixes.

Subsequently, for each load level and for each speed value, the optimal injection strategy is determined, on the basis of experimental tests.

The above-described heuristic procedure has been applied to a specific test case: control of the Common Rail supply system with two fuel-injection strategies in a diesel engine, the characteristics of which are reported in FIG. 1. FIG. 2 shows a simple map-injection control scheme relating to the engine at issue. In the above-described injection control scheme, the real-time choice of the injection strategy occurs through a linear interpolation among the parameter values ($param_1, \ldots, param_n$) contained in the maps.

The map-injection control is a static, open control system. The system is static since the control maps are determined off-line through a non sophisticated processing of the data gathered during the experimental tests; the control maps do not provide an on-line update of the contained values.

The system, moreover, is open since the injection law, obtained by the interpolation of the matrix values among which the driver demand shows up, is not monitored, i.e., it is not verified that the NOx and carbonaceous particulate emissions, corresponding to the current injection law, do not exceed the predetermined safety levels, and whether or not the corresponding torque is close to the driver demand. The explanatory example of FIG. 3 represents a typical static and open map injection control.

A dynamic, closed map control is obtained by adding to the static, open system: a model providing some operation parameters of the engine when the considered injection strategy varies, a threshold set relative to the operation parameters, and finally a set of rules (possibly fuzzy rules) for updating the current injection law and/or the values contained in the control maps of the system.

FIG. 4 describes the block scheme of a traditional dynamic, closed, map control.

It is to be noted that a model of the combustion process in a Diesel engine often requires a simulation meeting a series of complex processes: the air motion in the cylinder, the atomization and vaporization of the fuel, the mixture of the two fluids (air and fuel), and the reaction kinetics, which regulate the premixed and diffusive steps of the combustion.

There are two classes of models: multidimensional models and thermodynamic models. The multidimensional models try to provide all the fluid dynamic details of the phenomena intervening in the cylinder of a Diesel, such as: motion equations of the air inside the cylinder, the evolution of the fuel and the interaction thereof with the air, the evaporation of the liquid particles, and the development of the chemical reactions responsible for the pollutants formation.

These models are based on the solution of fundamental equations of preservation of the energy with finite different schemes. Even if the computational power demanded by these models can be provided by today's calculators, we are still far from being able to implement these models on a micro-controller for an on-line optimization of the injection strategy of engine.

The thermodynamic models make use of the first principle of thermodynamics and of correlations of the empirical type for a physical but synthetic description of different processes implied in the combustion; for this reason these models are also called phenomenological. In a simpler approach, the fluid can be considered of spatially uniform composition, temperature and pressure, i.e. variable only with time (i.e. functions only of the crank angle). In this case, the model is referred to as "single area" model, whereas the "multi-area"

ones take into account the space uneveness typical of the combustion of a Diesel engine.

In the case of a Diesel engine, as in general for internal combustion engines, the simplest way to simulate the combustion process is determining the law with which the burnt fuel fraction ($X_b$) varies.

The starting base for modelling the combustion process in an engine is the first principle of the thermodynamics applied to the gaseous system contained in the combustion chamber. In a first approximation, even if the combustion process is going on, the operation fluid can be considered homogeneous in composition, temperature and pressure, suitably choosing the relevant mean values of these values.

Neglecting the combustible mass that Q flows through the border surface of the chamber, the heat flow dissipated by the chemical combustion reactions $$\left(\frac{dQb}{d\theta}\right)$$

is equal to the sum of the variation of internal energy of the system $$\left(\frac{dE}{d\theta}\right),$$

of the mechanical power exchanged with the outside by means of the piston $$\left(\frac{dL}{d\theta}\right)$$

and of the amount of heat which is lost in contact with the cooled walls of the chamber $$\left(\frac{dQr}{d\theta}\right):$$

$$\frac{dQb}{d\theta} = \frac{dE}{d\theta} + \frac{dL}{d\theta} + \frac{dQr}{d\theta} \tag{3}$$

By approximating the fluid to a perfect gas of medium temperature equal to T, $E=mc_vT$, wherefrom, in the absence of mass fluids, it results that:

$$\frac{dE}{d\theta} = mc_v\frac{dT}{d\theta} \tag{4}$$

The power transferred to the piston is given by $$\frac{dL}{d\theta} = p\frac{dV}{d\theta} \tag{5}$$

By finally exploiting the status equation, the temperature can be expressed as a function of p and V:

$$T = \frac{pV}{mR} \tag{6}$$

By differentiating this latter:

$$\frac{dT}{d\theta} = \frac{p}{mR}\frac{dV}{d\theta} + \frac{V}{mR}\frac{dp}{d\theta} \tag{7}$$

By suitably mixing the previous expressions, the following expression is reached for the dissipation law of the heat:

$$\frac{dQb}{d\theta} = [c_v/R+1]p\frac{dV}{d\theta} + [c_v/R]V\frac{dp}{d\theta} + \frac{dQr}{d\theta} \tag{8}$$

By measuring the pressure cycle, being known the variation of the volume according to the crank angle and by using the status equation, it is possible to determine the trend of the medium temperature of the homogeneous fluid in the cylinder.

This is particularly useful in the models used for evaluating the losses of heat through the cooled walls $$\frac{dQr}{d\theta}.$$

By finally substituting V(θ), p(θ) and $$\frac{dQr}{d\theta}$$

in the previous equation the dissipation law of the heat is obtained according to the crank angle $$\frac{dQb}{d\theta}.$$

The integral of $$\frac{dQb}{d\theta}$$

between $\theta_i$ and $\theta_f$, combustion start and end angles, provides the amount of freed heat, almost equal to the product of the combustible mass $m_c$ multiplied by the lower calorific power $H_i$ thereof.

$$Qb = \int_{\theta i}^{\theta f}\frac{dQb}{d\theta}d\theta \cong mcHi \tag{9}$$

This approximation contained within a few % depends on the degree of completeness of the oxidation reactions and on the accuracy of the energetic analysis of the process. Deriving with respect to θ the logarithm of both members of the previous equation, one obtains the law relating how the burnt combustible mass fraction $x_b(\theta)$ varies.

$$\frac{1}{Qb}\frac{dQb}{d\theta} = \frac{1}{m_c}\frac{dm_c}{d\theta} = \frac{dx_b}{d\theta} \Rightarrow \frac{dQb}{d\theta} = m_cHi\frac{dx_b}{d\theta} \tag{10}$$

The combustible mass fraction $x_b(\theta)$ has an S-like form being approximable with sufficient precision by an exponential function (Wiebe function) of the type:

$$xb = 1 - \exp\left[-a\left(\frac{\theta-\theta i}{\theta f-\theta i}\right)^{m+1}\right] \tag{11}$$

with a suitable choice of the parameters a and m. The parameter a, called efficiency parameter, measures the completeness of the combustion process. Also m, called form factor of the chamber, conditions the combustion speed. Typical values of a are chosen in the range [4.605; 6.908] and they correspond to a completeness of the combustion process for (θ=θf) comprised between 99% and 99.9% (i.e. xb ∈[0.99; 0.999]). From FIGS. 8 and 9 it emerges that for low values of m the result is a high dissipation of heat in the starting step of the combustion (θ−θi<<θf−θi) to which a slow completion follows, whereas for high values of m the result is a high dissipation of heat in the final step of the combustion.

In synthesis, the simplest way to simulate the combustion process in a Diesel engine is to suppose that the law with which the burnt-fuel fraction $x_b$ varies is known. The $x_b$ can be determined either with points, on the basis of the processing of experimental surveys, or by the analytical via a Wiebe function. The analytical approach has several limits. First of all, it is necessary to determine the parameters describing the Wiebe function for different operation conditions of the engine. To this purpose, the efficiency parameter a is normally supposed to be constant (for example, by considering the combustion almost completed, it is supposed a=6.9) and the variations of the form factor m and of the combustion duration (θf−θi) are calculated by means of empirical correlations of the type:

$$m=m_r(\tau_{a,r}/\tau_a)^{0.5}(p_1/p_{1,r})(T_{1,r}/T_1)(n_r/n)^{0.3}$$

$$\theta f-\theta i=(\theta f-\theta i)_r(\phi/\phi_r)^{0.6}(n_r/n)^{0.5} \tag{12}$$

where the index r indicates the data relating to the reference conditions, p1 and T1 indicate the pressure and the temperature in the cylinder at the beginning of the compression and $T_a$ is the hangfire. An approach of this type covers however only a limited operation field of the engine and it often requires in any case a wide recourse to experimental data for the set-up of the Wiebe parameters. A second limit is that it is often impossible for a single Wiebe function to simultaneously take into account the premixed, diffusive step of the combustion. The dissipation curve of the heat of a Diesel engine is in fact the overlapping of two curves: one relating to the premixed step and the second relating to the diffusive step of the combustion. This limit of the analytic model with single Wiebe has been overcome with a "single area" model proposed by N. Watson:

$$xb(\theta)=\beta f1(\theta, k1, k2)+(1-\beta)f2(\theta, a2, m2) \tag{13}$$

In this model β represents the fuel fraction which burns in the premixed step in relation with the burnt total whereas f2(θ, a2, m2) and f1(θ, k1, k2) are functions corresponding to the diffusive and premixed step of the combustion. While f2(θ, a2, m2) is the typical Wiebe function characterized by the form parameters a2 and m2, the form Watson has find to be more reasonable for f1(θ, k1, k2) is the following:

$$f1(\theta, k1, k2) = 1-\left[1-\left(\frac{\theta-\theta i}{\theta f-\theta i}\right)^{k1}\right]^{k2} \tag{14}$$

Also in this approach, a large amount of experimental data is required for the set-up of the parameters (k1; k2; a2; m2) which characterize the $x_b(\theta)$ in the various operating points of the engine.

Both the model with single Wiebe and that of Watson are often inadequate to describe the trend of $x_b$ in Diesel engines supplied with a multiple fuel injection. FIG. 10 reports the typical profile of an HRR relating to our test case: Diesel Common Rail engine supplied with a double fuel injection.

This HRR, acquired in a test room for a speed=2200 rpm and a double injection strategy (SOI; ON1; DW1; ON2)=(−22; 0.18; 0.8; 0.42), is in reality a medium HRR, since it is mediated on 100 cycles of pressure. Both in the figures and in the preceding relations, while the SOI parameters (Start of Injection) is measured in degrees of the crank angle, the parameters ON1 (duration of the first injection, i.e. duration of the "Pilot"), DW1 (dead time between the two injections, i.e. "Dwell time") and ON2 (duration of the second injection, i.e. duration of the "Main") are measured in milliseconds as schematized in FIG. 11.

From a first comparison between FIGS. 7 and 10, the absence or at least the non clear distinguishability is noted, in the case of the HRR relating to a double fuel injection, of a pre-mixed and diffusive step of the combustion. A more careful analysis suggests the presence, however, of two main steps in the described combustion process. These two steps are called "Pilot" and "Main" of the HRR. The first step develops between about −10 and −5 crank angle and it relates to the combustion primed by the "Pilot".

The second one develops between about −5 and 60 crank angle and it relates to the combustion part primed by the "Main". In each one of these two steps it is possible to single out different under-steps difficult to be traced to the classic scheme of the pre-mixed and diffusive step of the combustion process associated with a single fuel injection.

Moreover the presence of the "Pilot" step itself is not always ensured, and if it is present, it is not sure that it is clearly distinguished from the "Main" step. FIGS. 12 and 13 summarize what has been now exposed. From the figures it emerges that for small values of SOI, i.e. for a pronounced advance of the injection, it is not sure that the "Pilot" step of the combustion is primed.

In conclusion, the models used for establishing $x_b$ in a single injection Diesel engine are often inadequate to describe the combustion process in engines supplied with a multiple fuel injection.

When the number of injections increases, the profile of the HRR becomes more complicated. The characterizing parts of the combustion process increase, and the factors affecting the form and the presence itself thereof increase. Under these circumstances, a mode, which effectively establishes the $x_b$ trend, should first be flexible and general.

That is, it adapts itself to any multiple fuel-injection strategy, and thus to any form of the HRR. In second place, the model reconstructs the mean HRR, relating to a given engine point and to a given multiple injection strategy, with a low margin of error. In so doing, the model could be used for making the map injection control system closed and dynamic.

Therefore, a need has arisen for a virtual combustion sensor for a real-time feedback in an injection management system of a closed-loop type for an engine (closed loop EMS).

SUMMARY

An embodiment of the invention is development of a "grey box" model able to establish the combustion process in a diesel common rail engine taking into account the speed of the engine and of the parameters which control the multiple injection steps.

More specifically, a model based on neural networks, which, by training on an heterogeneous sample of data relating to the operation under stationary conditions of an engine, succeed in establishing, with a low error margin, the trend of some operation parameters thereof.

Characteristics and advantages of embodiments of the invention will be apparent from the following description given by way of indicative and non-limiting example with reference to the annexed drawings.

DETAILED DESCRIPTION

A much used tool in the automotive field for the engine management are the neural networks which can be interpreted as "grey-box" models. These "grey-box" models, by training on an heterogeneous sample of data relating to the engine operation under stationary conditions, succeed in establishing or anticipating, with a low error margin, the trend of some parameters.

Figure 14:
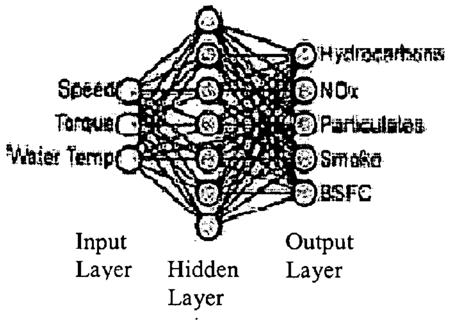
FIG. 14 shows the scheme of a neural network MLP used by Ford Motor Co for establishing the emissions of an experimental diesel engine.

FIG. 14 is the scheme of a neural network MLP (Multi Layer Perceptrons) with a single hidden layer used by the research centre of Ford Motor Co. (in a research project in common with Lucas Diesel Systems and Johnson Matthey Catalytic Systems) for establishing the emissions in the experimental engine Ford 1.8DI TCi Diesel.

This is not the only case wherein neural networks are used in the engine management. In some schemes, neural networks RBF (Radial Basis Function) are trained for the dynamic modelling (real time) and off-line of different operation parameters of the engine (injection angle, NOx emissions, carbonaceous particulate emissions, etc.).

In other schemes neural networks RBF are employed for the simulation of the cylinder pressure in an inner combustion engine. In the model constructed for the simulation of $x_b$, neural networks MLP have an active role.

The realization of the model, according to an embodiment of the invention for establishing the mean HRR, comprises the following steps:

- choice of the number of Wiebe functions whereon the HRR signal is decomposed;
- transform Ψ
- clustering the transform Ψ output
- evolutive designing of the neural network MLP
- training and testing of the neural network MLP In the first step, the number of Wiebe functions is chosen whereon the HRR signal is to be decomposed. In the second step, similarly to the analysis by means of wavelet transform of a signal, a transform is sought which can characterise the experimental signal of a mean HRR by means of a limited number of parameters:

$$\Psi(HRR(\theta))=(c^k_1, \ldots, c^k_2, c^k_s)k=1, 2, \ldots, K \quad (15)$$

In the previous relation HRR(θ) is the mean HRR signal acquired in the test room for a given fuel multiple injection, strategy and for a given engine point whereas ($c^k_1, \ldots, c^k_2, c^k_s$) with k=1, 2, . . . , K are the strings K of coefficients s associated by means of the transform Ψ with the examined signal.

In the third step, through a homogeneity analysis (clustering), the "optimal" coefficient strings are determined, taking the principles of the theory of the Tikhonov regularization of non "well-posed" problems as reference.

The last steps of the design are dedicated to the designing, to the training, and to the testing of a neural network MLP which has, as inputs, the system inputs (speed, $param_1$, . . . , $param_n$) and as outputs the corresponding coefficient strings selected in the preceding passages.

The final result is a "grey-box" model able to reconstruct, in a satisfactory way, the mean HRR associated with a given injection strategy and with a given engine point.

Figure 15:
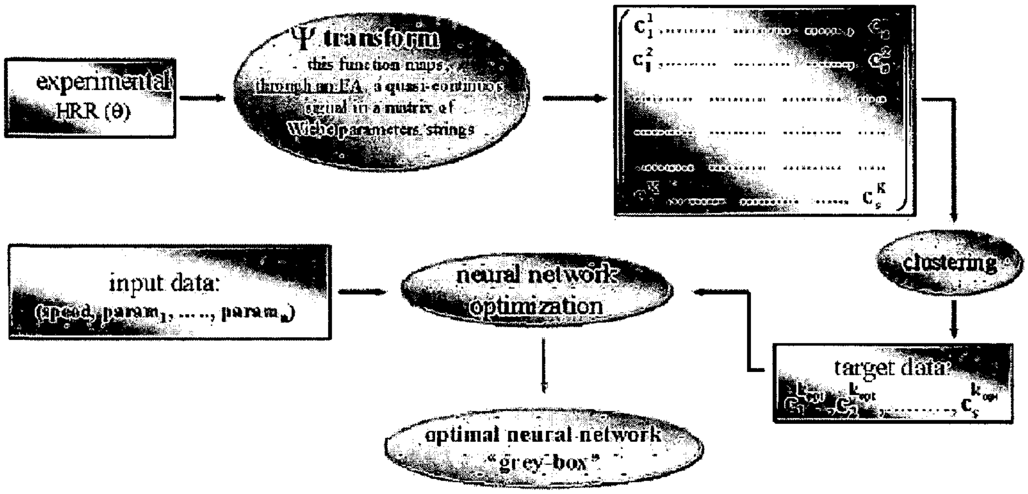
FIG. 15 shows a block scheme of the "grey-box" model constructed for the simulation of the heat dissipation curve of a diesel engine.
Figure 16:
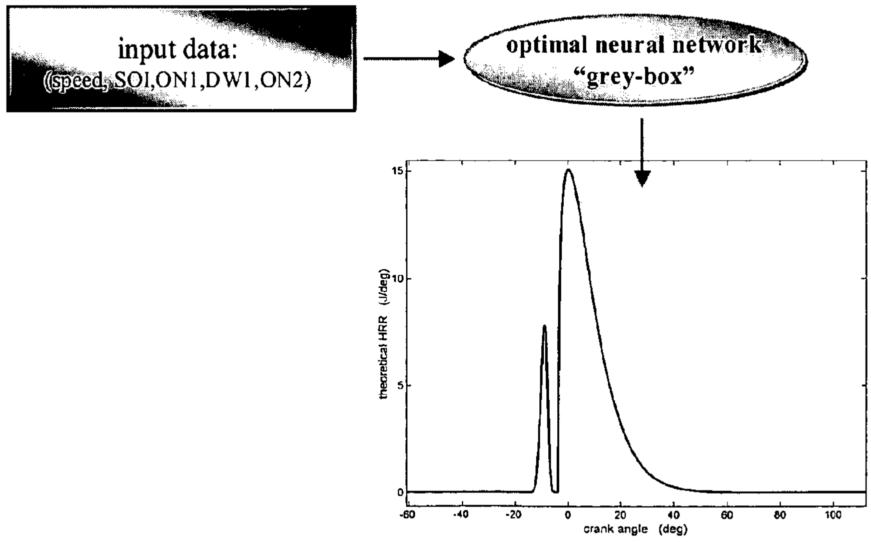
FIG. 16 shows a data flow of the "grey-box" model constructed for the simulation of the heat dissipation curve of a diesel engine.

The network reproduces the coefficients which, in the functional chosen set (set of Wiebe functions), characterize the HRR signal. FIGS. 15 and 16 describe the block scheme and the data flow of the model according to an embodiment of the invention.

The transform Ψ, present in the block scheme of FIG. 15, is obtained by throwing an evolutive algorithm, which minimises an error function relating to the fitting of the experimental HRR, on the considered Wiebe function set.

In this case, we have used an ES−(1+1) as an evolutive algorithm and the mean quadratic error as the error function associated with the fitting of the experimental signal on the overlap of Wiebe functions. These functions are the reference functional set for the decomposition of the HRR signal.

Figure 17:
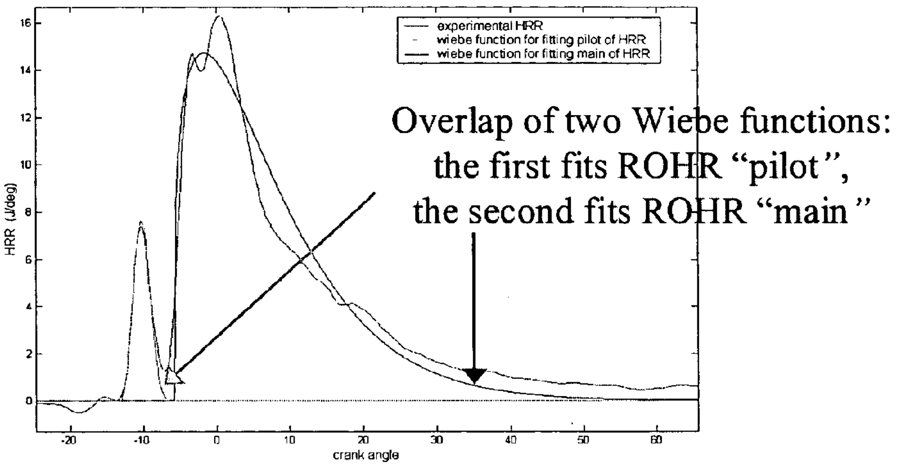
FIG. 17 shows the set of two Wiebe functions used for fitting the HRR relating to our test case according to an embodiment of the invention.

FIG. 17 indicates the set of two Wiebe functions used for the fitting of the mean HRR relating to our test case. The first of the two functions approximates the "Pilot" step of the HRR, whereas the second function approximates the "Main" step.

For this example functional set, the number s of coefficients ($c^k_1$, . . . , $c^k_2$, $c^k_s$) is equal to 10; i.e. for each Wiebe function, the parameters that the evolutive algorithm determines are the following five parameters: a-efficiency parameter of the combustion, m-chamber form factor, θi and θf-start and end angles of the combustion, and finally $m_c$-combustible mass. These parameters relate only to the combustion process part, which is approximated by the examined Wiebe function.

By increasing the number of Wiebe functions whereon the experimental HRR are to be decomposed, the space sizes of the parameters whereon the evolutive algorithm operates increase with a corresponding computational waste in the search for the K strings of coefficients satisfying a given threshold condition for the fitting error.

Under these circumstances, it is suitable to increase the starting population of the evolutive algorithm P and the minimum number of strings satisfying the threshold condition, K. P indicates the number of coefficient strings randomly extracted in their definition range, K indicates instead the minimum number of strings of the population which must satisfy the threshold condition before the algorithm ends its execution.

If the algorithm converges without the K strings having reached the threshold condition, it is performed again with an increased P. The process ends when coefficient K strings reach the threshold condition imposed at the beginning, see FIG. 18.

From carried-out tests it is evinced that reasonable values for P. K and ΔP are:

$$P=50\ Wn$$

$$K\in[5\ Wn;\ 10\ Wn]$$

$$\Delta P=0.1\ P \tag{16}$$

In the previous relation, Wn indicates the number of the chosen Wiebe functions whereon the HRR signal is to be decomposed. An evolutive algorithm, e.g. the ES−(1+1), converges when all the P strings, constituting the population individuals for a certain number of iterations $t_{min}$, do not remarkably improve the fitness thereof, i.e. when $$|\Delta f^{t,t+1}{}_j / f^t_j| \leqq Erconv\quad j=1, 2, \ldots P \tag{17}$$

In the previous $\Delta f^{t,t+1}{}_j$ describes the fitness variation of the j-th individual of the population between the step t and t+1 of the algorithm, $Er_{conv}$ represents instead the maximal relative fitness variation which the j-th individual must undergo so that the algorithm comes to convergence.

Figure 18:
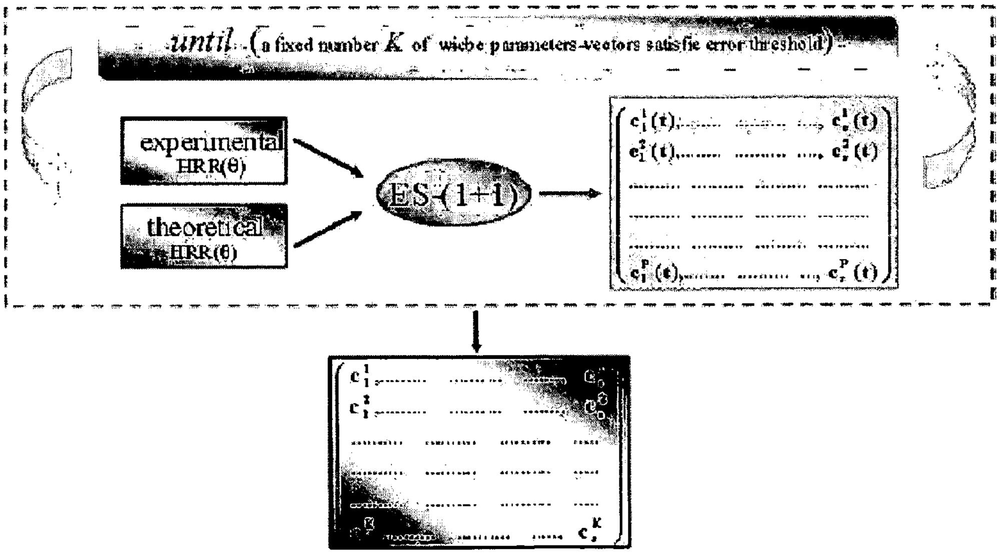
FIG. 18 shows the block scheme and the data flow of the transform according to an embodiment of the invention.
Figure 19:
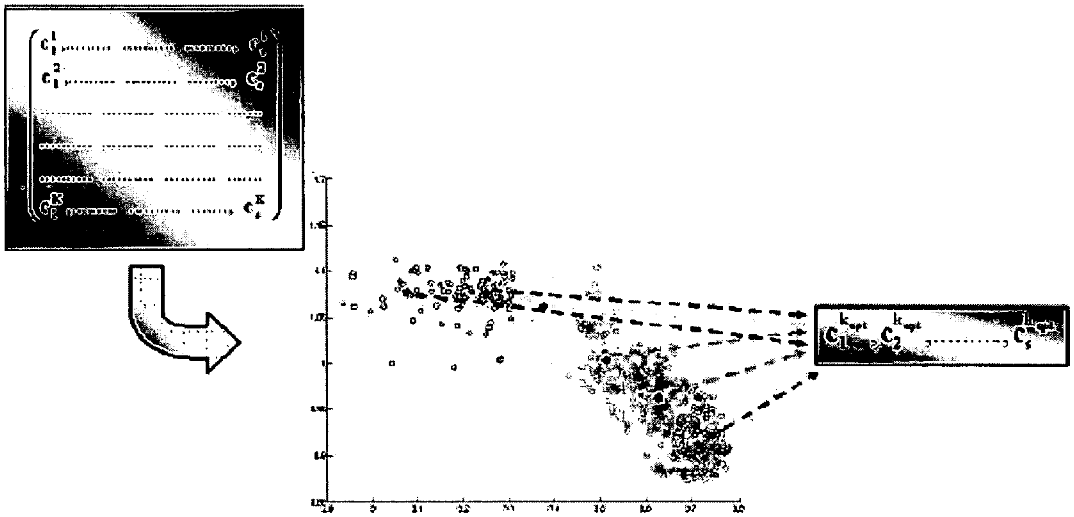
FIG. 19 shows the data flow of the used clustering algorithm according to an embodiment of the invention.
Figure 20:
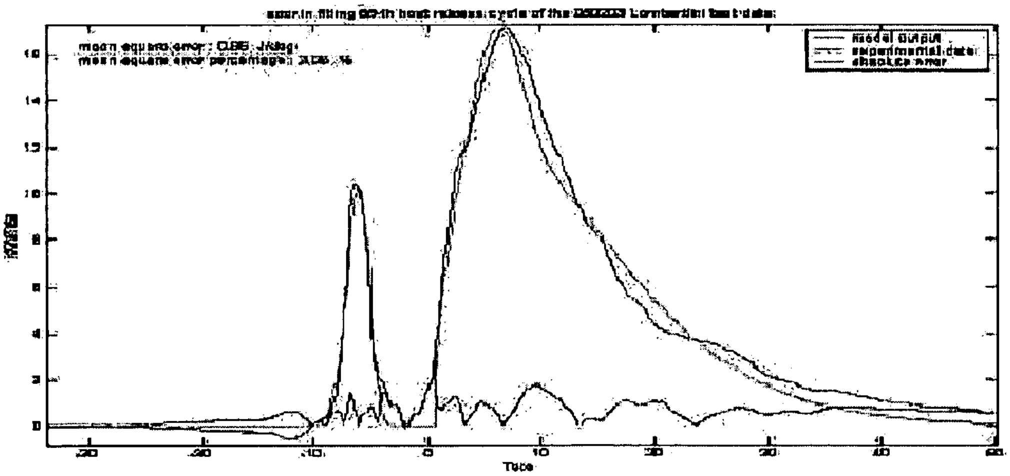
FIG. 20 shows the reconstruction of the mean HRR relating to the diesel common rail engine of our test case for a given operation condition according to an embodiment of the invention.

Both from the relation (15) and from FIG. 18 it emerges that the result of the transform may not be univocal. In fact, once a threshold is fixed for the approximation error of the experimental HRR cycle, the coefficient strings ($c^k_1$, . . . , $c^k_s$), and thus the Wiebe function configurations for which an HRR fitting is realized with an error less than or equal to the threshold, are exactly K.

In the second step of the design of the model, the matrixes of coefficients ($c^k_1$, . . . , $c^k_s$) with k=1, . . . , k, associated, by means of the transform, with the input data (speed, $param_1$, . . . , $param_n$) are analyzed by a clustering algorithm.

The aim is that of singling out "optimal" coefficient strings (ckopt1, . . . , ckopts), in correspondence wherewith similar variations occur between the input data and the output data (output data mean the coefficient strings).

The "grey-box" model, effective to simulate the trend of the mean HRR for a diesel engine, is, in practice, a neural network MLP. This network trains on a set of previously taken experimental input data and of corresponding output data (ckopt1, . . . , ckopts), in order to effectively establish the coefficient string ($c^k_1$, . . . , $c^k_s$) associated with any input datum.

These strings are exactly those which, in the chosen functional set, allow an easy reconstruction of the HRR signal. For better understanding of what has been now described, we have to take into account that the realization of a neural network is substantially a problem of reconstruction of a hyper-surface starting from a set of points.

The points at issue are the pairs of input data and output data whereon the network is trained. From a mathematical point of view, the cited reconstruction problem is generally a non well-posed problem. In fact, the presence of noise and/or imprecision in the acquirement of the experimental data increases the probability that one of the three conditions characterising a well-posed problem is not satisfied.

In this regard, we recall the conditions which must be satisfied so that, given a map f(X)→Y, the map reconstruction problem is well posed:

Existence, ∀x∈X∃y=f(x)dove y∈Y

Unicity, ∀x,t∈X si ha che f(t)=f(x)⇔x=t

Continuity, ∀∈>∃∂=∂(∈) tale che ρx(x,t)<∂⇒ρy(f(x),f(t)) <∈

In the previous conditions, the symbol $\rho_x$( . . . , . . . ) indicates the distance between the two arguments thereof in the reference vectorial space (this latter is singled out by the subscript of the function $\rho_x$). If only one of the three conditions is not satisfied, then the problem is called non well-posed; this means that, of all the sample of available data for the training of the neural network, only a few are effectively used in the reconstruction of the map f.

However a theory exists, known as regulation theory, for solving non well-posed reconstruction problems.

The idea underlying this theory is that of stabilizing the map f(X)→Y realised by means of the neural network, so that the Δx is of the same meter of magnitude as Δy.

This turns out by choosing those strings ($c_{opt1}{}^k$, . . . , $c_{opts}{}^k$) in correspondence wherewith:

$$\sum_{i,j=1}^{N_{tot}} |\Delta x_{ij} - \Delta y_{ij}^{opt}| = \min\left(\sum_{k,h=1}^{K}\sum_{i,j=1}^{N_{tot}} |\Delta x_{ij} - \Delta y_{ij}^{k,h}|\right) \tag{18}$$

where $$\Delta x_{ij}=|(\text{speed}^{(i)},\text{param}_1^{(i)}, \ldots ,\text{param}_n^{(i)})-(\text{speed}^{(j)}, \text{param}_1^{(j)}, \ldots ,\text{param}_n^{(j)})| \quad (19)$$

$$\Delta y_{ij}^{k,h}=|(c_1^{k,(i)}, \ldots ; c_s^{k,(i)})-(c_1^{h,(j)}, \ldots ; c_s^{h,(j)})| \quad (20)$$

By fixing a set of input data ($\text{speed}^{(i)}$, $\text{param}^{(i)}$, . . . , $\text{param}_n^{(i)}$) with i=1, . . . , $N_{tot}$ the number of possible coefficient strings which can be related, by means of the transform Ψ, to the input data, is of $K^{N}_{tot}$. Thus, the least expensive way, at a computational level, for finding the minimum of the sum in the preceding relation is that of applying an evolutive algorithm.

The generic individual whereon the evolutive algorithm works is a combination of $N_{tot}$ strings of s coefficients, chosen between the $K^{N}_{tot}$ being available. As it is evinced from FIG. 22, the choice of the optimal strings ($c_{opt1}^{k}$, . . . , $c_{opts}^{k}$) seems like the extraction of the barycentres from a distribution of $N_{tot}$ clusters.

The last step of the set-up process of the model coincides with the training of a neural network MLP on the set of $N_{tot}$ input data and of the corresponding target data. These latter are the coefficient strings ($c_{opt1}^{k}$, . . . , $c_{opts}^{k}$) selected in the previous clustering step. The topology of the used MLP network has not been chosen in an "empirical" way.

Both the number of neurons of the network hidden state and the regularization factor of the performance function have been chosen by means of the evolutive algorithm. As a target function of the algorithm, we have considered the mean of the mean quadratic error in the testing step of the network, on three distinct testing steps.

That is, for the topology current of the network (individual of the evolutive algorithm) we have carried out the random permutations of the whole set of input-target data and for each permutation the network has been trained and tested. The error during the testing step, mediated on the three permutations, constitutes the algorithm fitness.

The final result is a network able to establish, from a given fuel multiple injection strategy and a given engine point, the coefficient string which, in the Wiebe functional set, reconstructs the mean HRR signal.

Figures 1, 2:
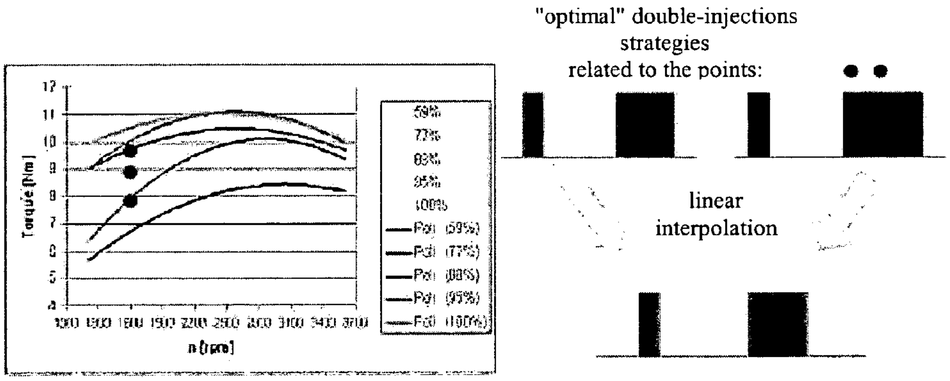
FIG. 1 describes the characteristics of a conventional low-powered diesel engine.
FIG. 2 shows an explanatory scheme of the control, by means of conventional control maps, of the fuel double injection strategy in a low-powered diesel engine.
Figure 3:
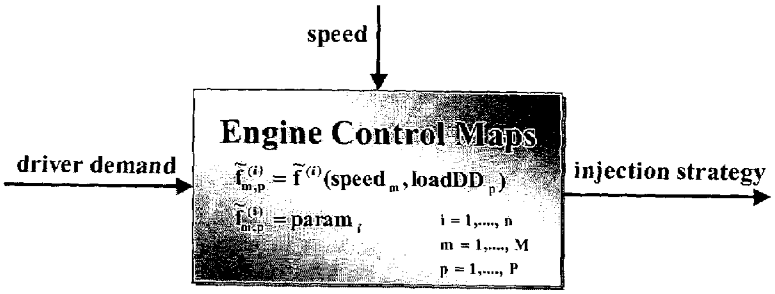
FIG. 3 shows an explanatory scheme of a typical static and open map injection control.
Figure 4:
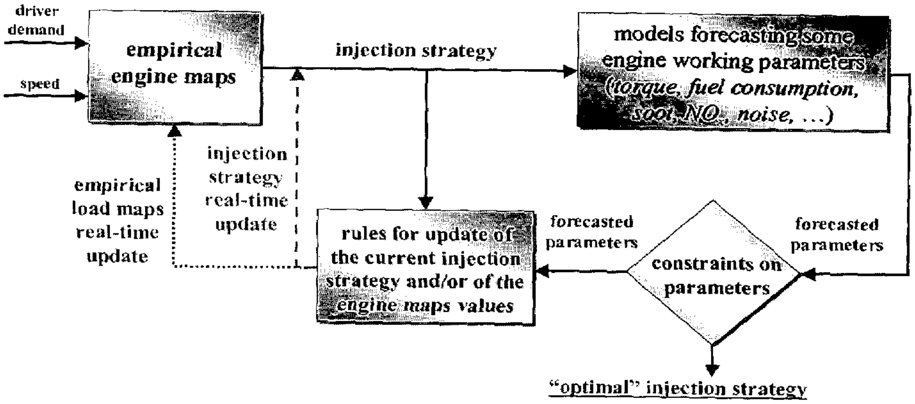
FIG. 4 shows an explanatory scheme of a typical dynamic and closed map injection control.
Figure 5:
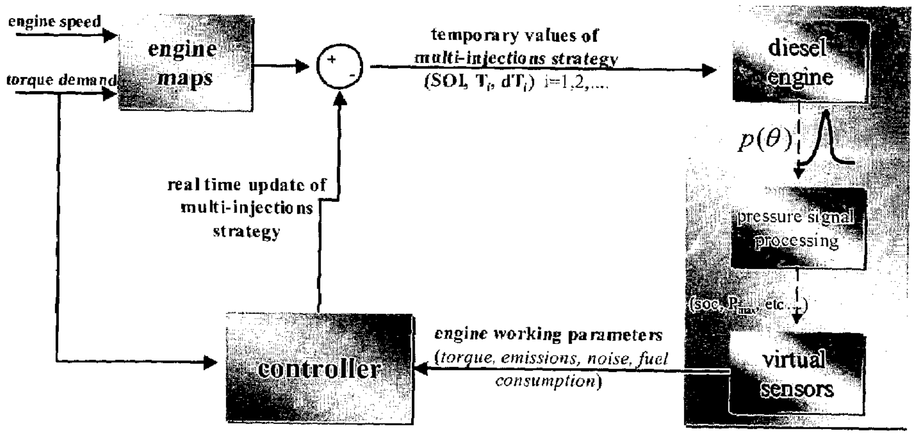
FIG. 5 shows an explanatory scheme of a typical static and closed map injection control.
Figure 6:
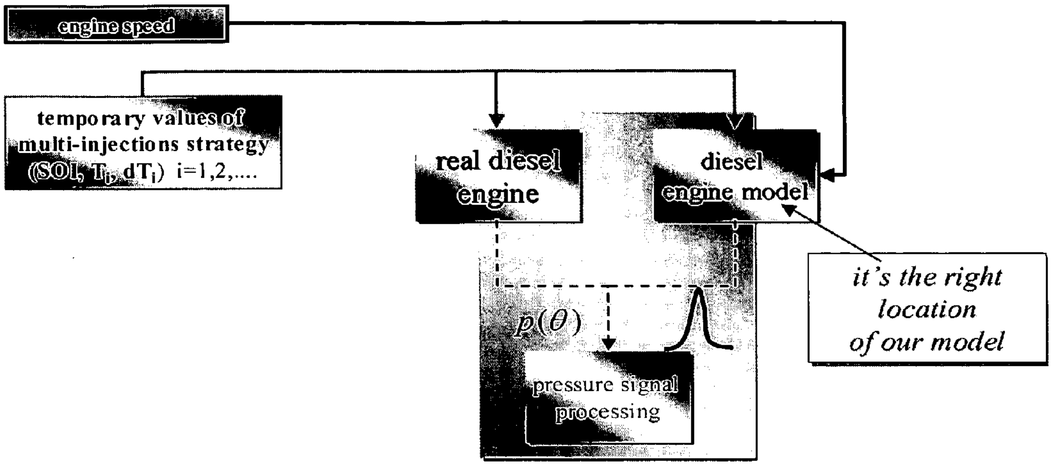
FIG. 6 shows the natural position of the model according to an embodiment of the invention in a closed control scheme.
Figure 7:
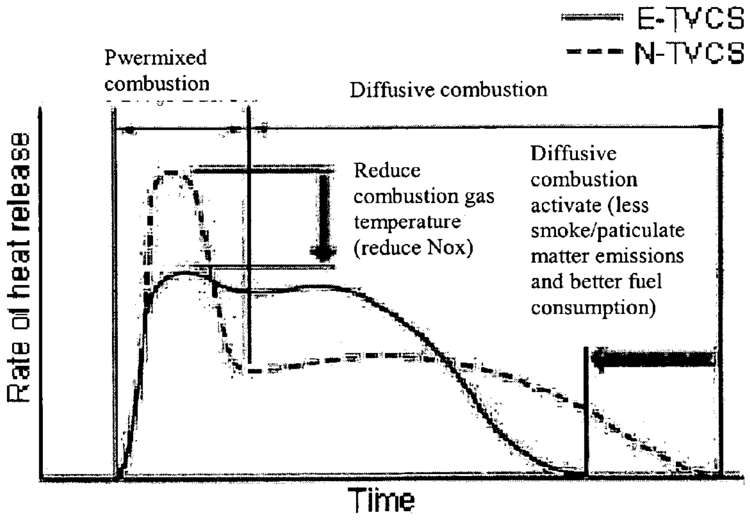
FIG. 7 shows the link between the HRR trend and the emissions of NOx and carbonaceous particulate.
Figure 8:
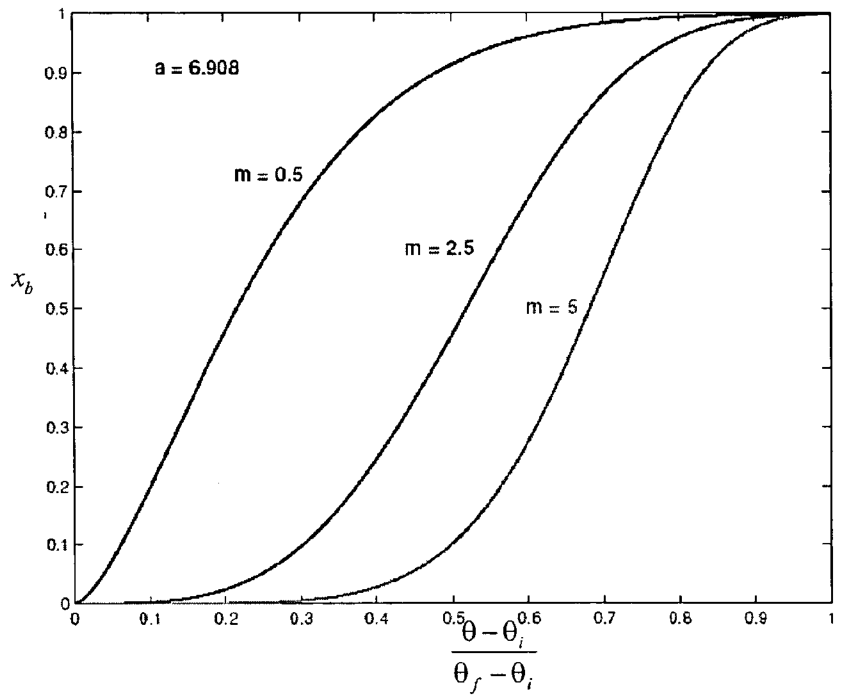
FIG. 8 shows the trend of the combusted fraction $x_b$ according to the non-dimensional crank angle tetan=(θ−θi)/(θf−θi) when the form factor of the chamber m varies.
Figure 9:
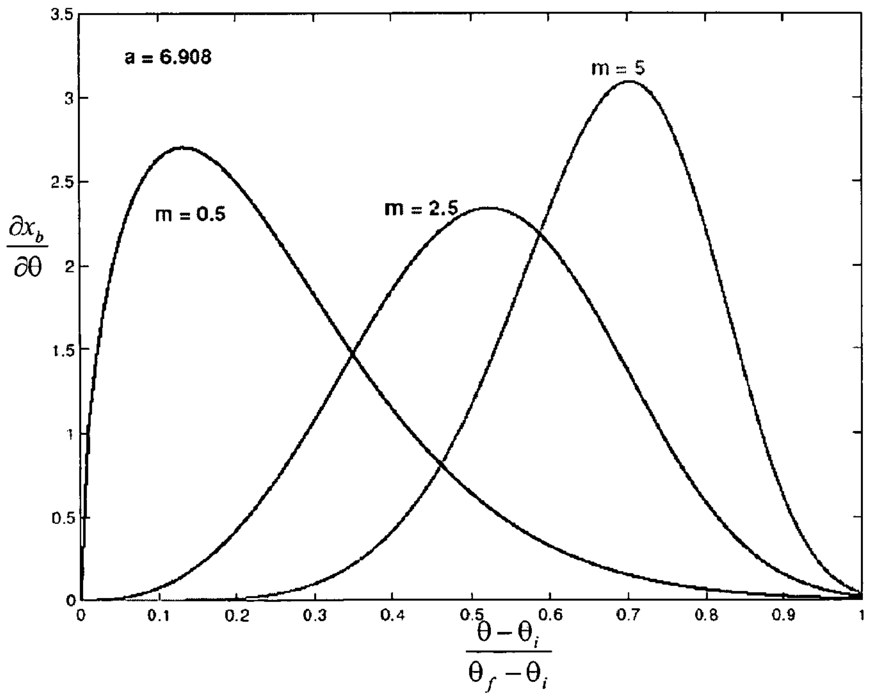
FIG. 9 shows the trend of the combusted fraction $dx_b/d\theta$ according to the non-dimensional crank angle tetan=(θ−θi)/(θf−θi) when the form factor of the chamber m varies.
Figure 10:
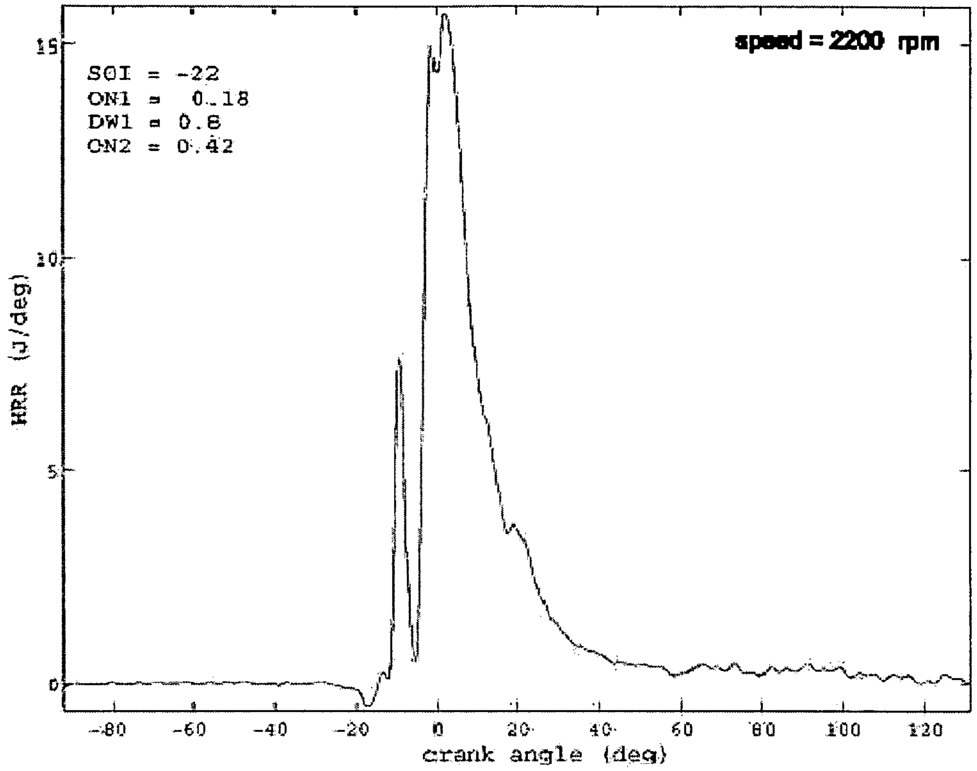
FIG. 10 shows the mean HRR trend for an operation condition of an engine.
Figure 11:
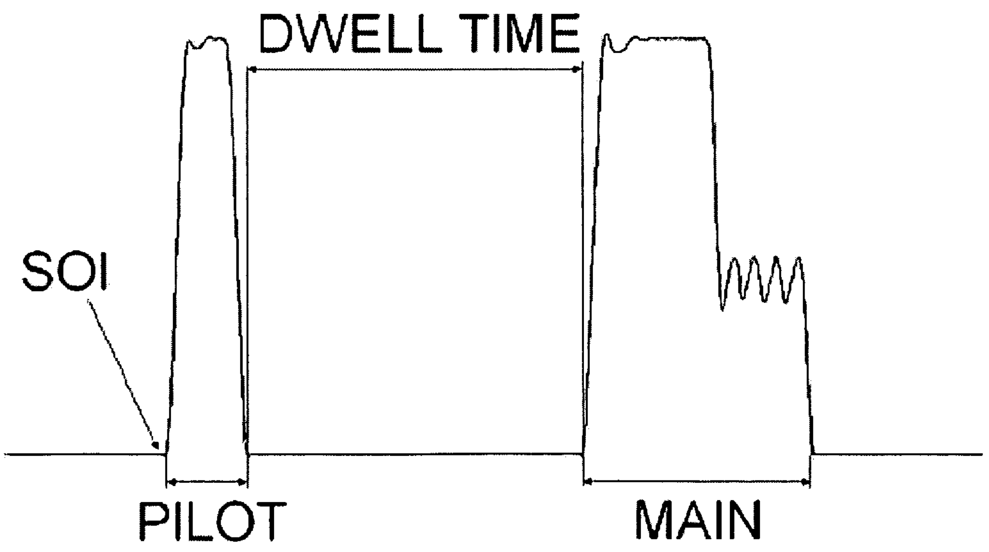
FIG. 11 shows the parameters characterizing the control current of the common rail injector installed on the engine of the "test case".
Figure 12:
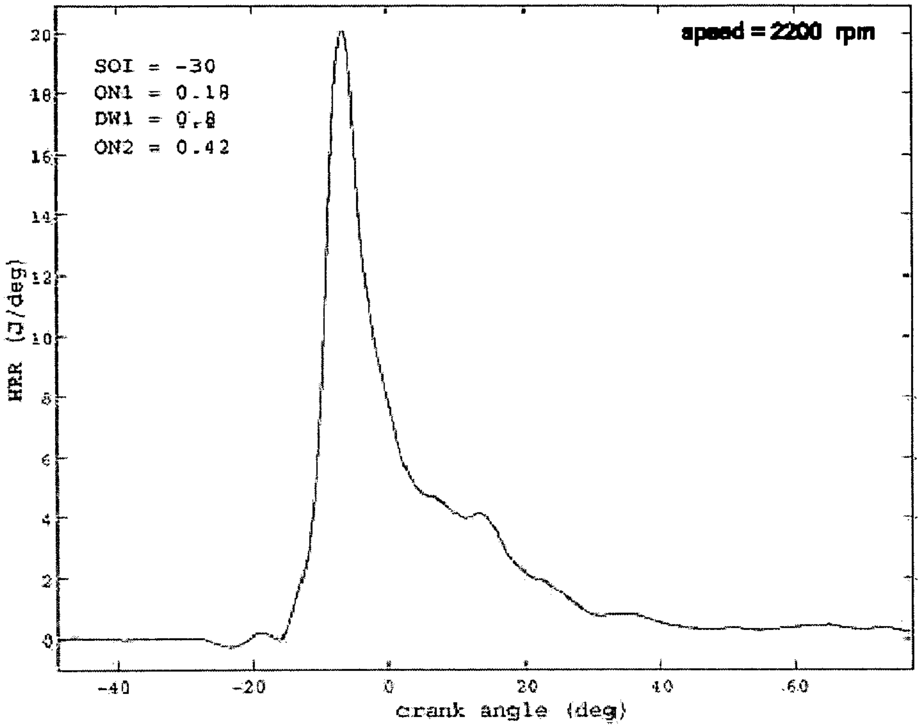
FIG. 12 shows the mean HRR trend for an operation condition of the engine with a very high advance of injection, SOI=−30.
Figure 13:
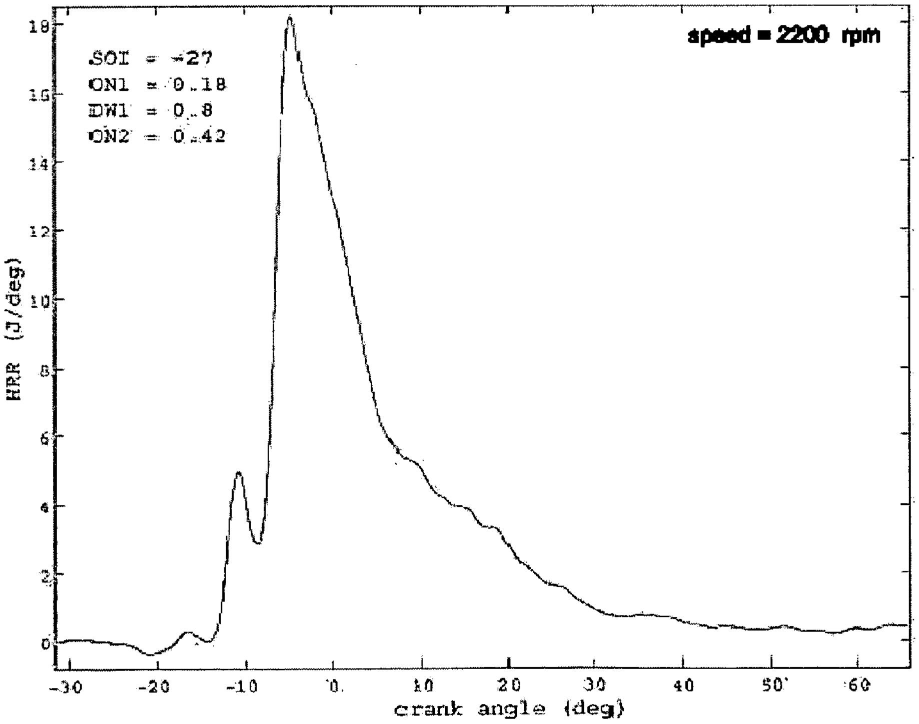
FIG. 13 shows the mean HRR trend for an operation condition of the engine with a high advance of injection, SOI=−27.
Figure 21:
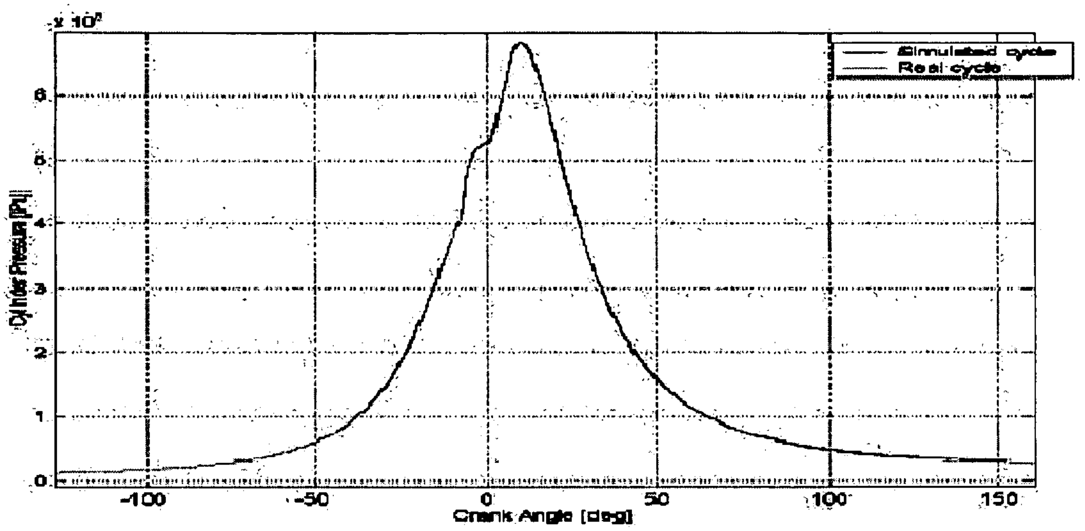
FIG. 21 shows the reconstruction of the pressure cycle, relating to the diesel common rail engine of our test case, starting from the mean HRR constructed by means of the "grey-box" model according to an embodiment of the invention.
Figure 22:
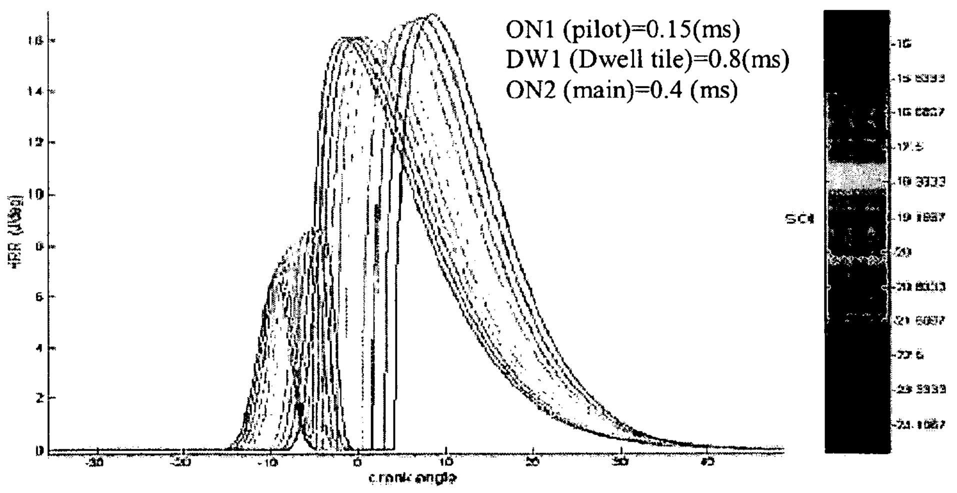
FIG. 22 shows the establishment of the mean HRR relating to the diesel common rail engine of our test case, when only one the four injection parameters (SOI; ON1, DW1; ON2) varies according to an embodiment of the invention.

The above described "grey-box" model of simulation of the HRR, has been applied to the following test case: diesel common rail engine supplied with double fuel injection; the characteristics of the engine are summarised in FIG. 1. FIGS. 18, 21 and 22 show the preliminary results of this work.

The error of fitting, of the HRR and of the associated pressure cycle, are remarkably low. This demonstrates the fact that the proposed model has a great establishing capacity.

The calibration procedure of the characteristic parameters of the Wiebe functions, which describe the trend of the heat dissipation speed (HRR) in combustion processes in diesel engines with common rail injection system, consists in comprising the dynamics of the inner cylinder processes for a predetermined geometry of the combustion chamber.

Each diesel engine differs from another not only by the main geometric characteristics, i.e. run, bore and compression ratio, but also for the intake and exhaust conduit geometry and for the bowl geometry.

Therefore, in one embodiment, models for establishing the HRR are valid through experimental tests in the factory for each propeller geometry in the whole operation field of this latter.

The control parameters of the above-described common rail injection system according to an embodiment of the invention are: the injection pressure and the control strategy of the injectors (SOI, duration and rest between the control currents of the injectors). A first typology of experimental tests is aimed at measuring the amount of fuel injected by each injection at a predetermined pressure inside the rail and for a combination of the duration and of the rest between the injections.

The second typology of the tests relates to the dynamics of the combustion processes. These are realized in an engine testing room, through measures of the pressure in the cylinder under predetermined operation conditions. The engine being the subject of this study is installed on an engine testing bank and it is connected with a dynamometric brake, i.e. with a device able to absorb the power generated by the propeller and to measure the torque delivered therefrom.

Measures of the pressure in chamber effective to characterize the combustion processes when the control parameters and the speed vary are carried out inside the operation field of the engine. The characterization of the processes starting from the measure of the pressure in chamber first consists in the analysis and in the treatment of the acquired data and then in the calculation of the HRR through the formula 8, 9, 10.

Once the experimental HRR are obtained, the steps relating to the realization of the model for establishing the HRR are repeated. The number of data to acquire in the testing room depends on the desired accuracy for the model in the establishment of the combustion process and thus of the pressure in chamber of the engine.

Figure 23:
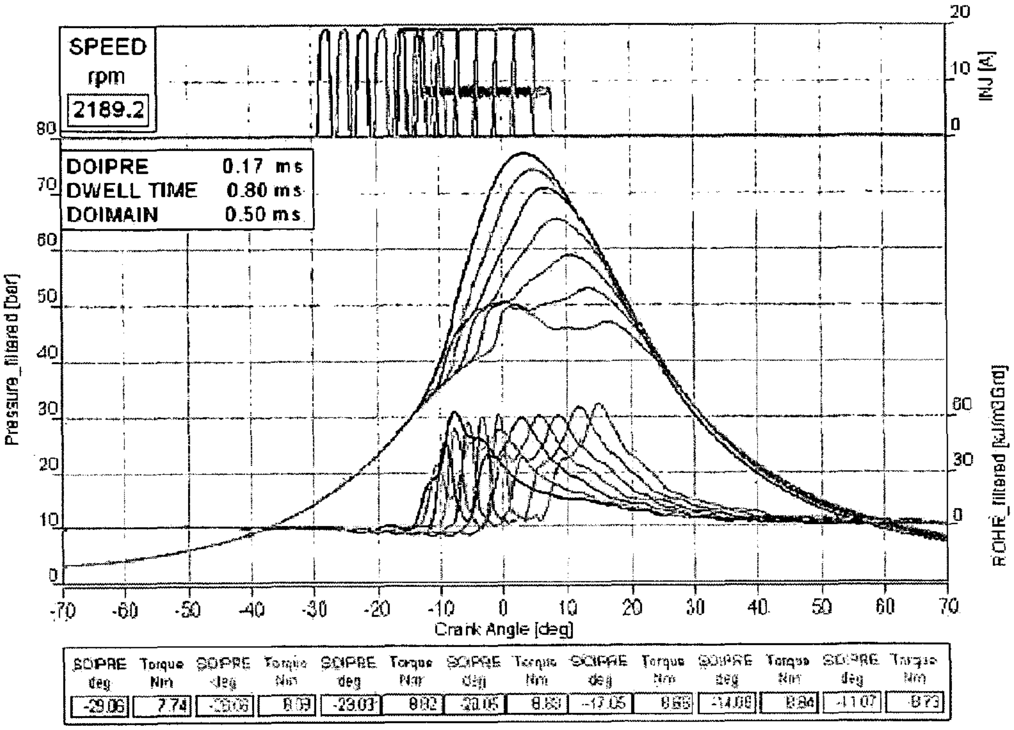
FIG. 23 shows the pressure cycles acquired when SOI varies for fixed parameter values (ON1; DW1; ON2)=(0:17; 0:8; 0:5) according to an embodiment of the invention.
Figure 24:
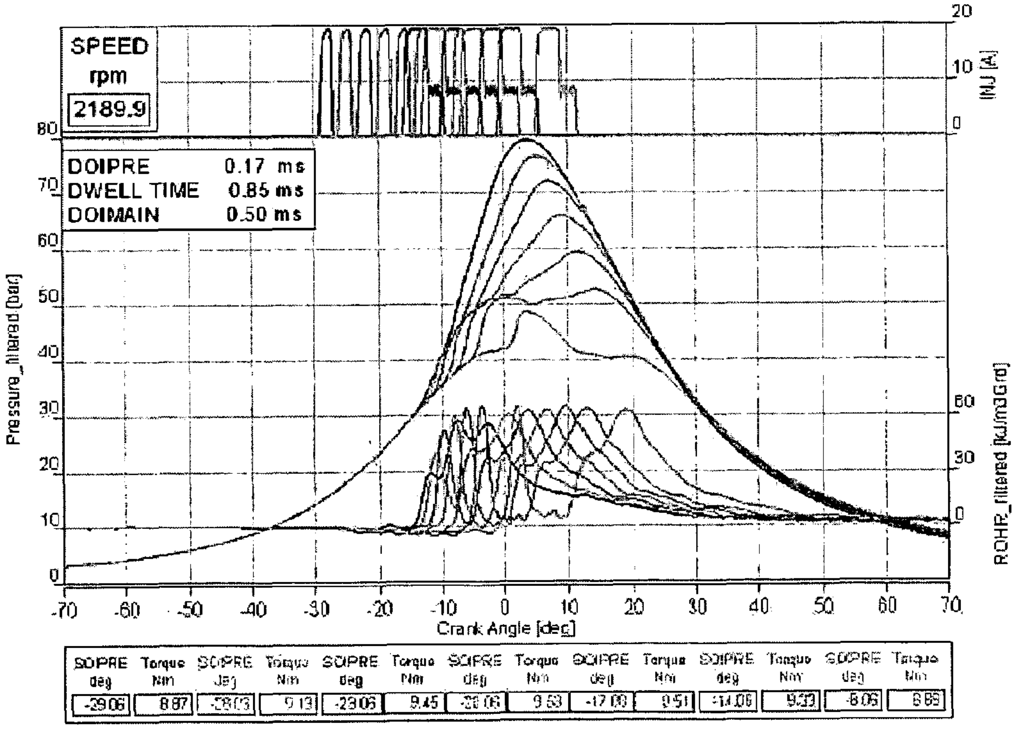
FIG. 24 shows the pressure cycles acquired when SOI varies for fixed parameter values (ON1; DW1; ON2)=(0:17; 0:85; 0:5) according to an embodiment of the invention.
Figure 25:
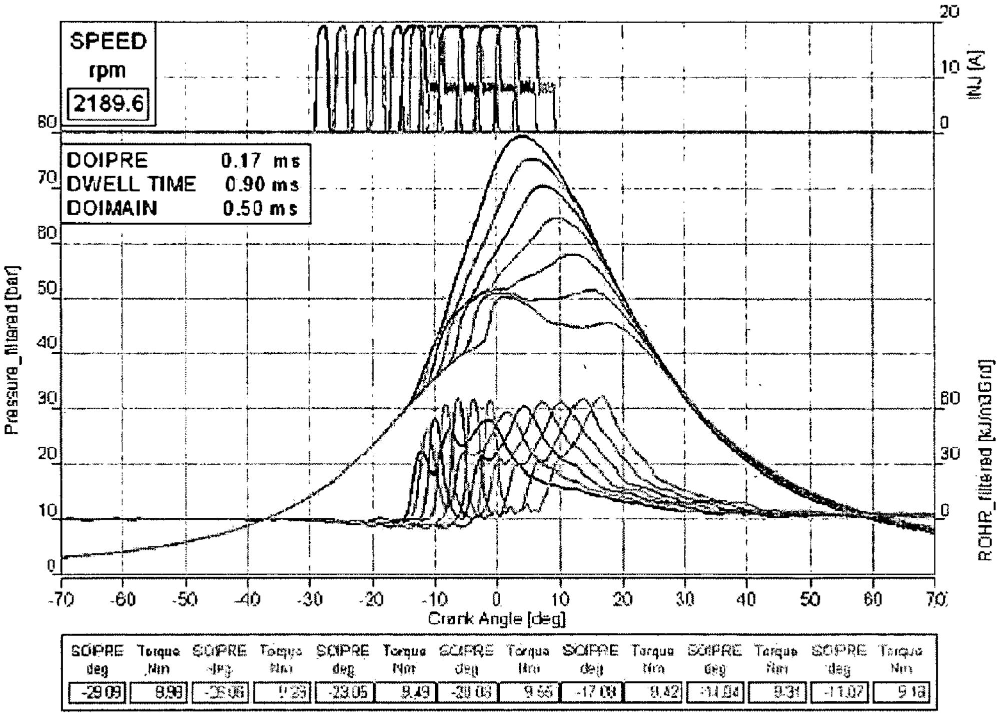
FIG. 25 shows the pressure cycles acquired when SOI varies for fixed parameter values (ON1; DW1; ON2)=(0:17; 0:9; 0:5) according to an embodiment of the invention.
Figure 26:
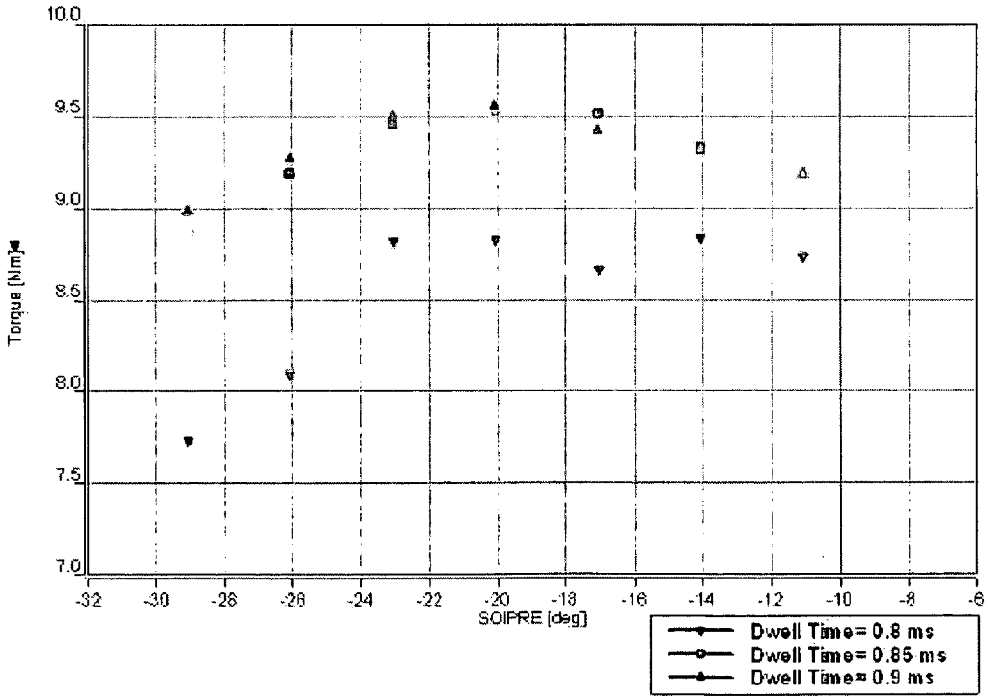
FIG. 26 shows the summarizing scheme of the torque measured at the driving shaft for different made acquirements according to an embodiment of the invention.

FIGS. 23, 24 and 25 report an example of the pressure in the cylinder for a rotation speed of 2200 rpm and for different control strategies of the two-injection injector, which differ for the shift of the first injection SOI and for the interval between the two ("dwell time"). A summarizing diagram has also been reported of the measured driving shaft torques, see FIG. 26.

Embodiments of the above-described techniques may be implemented in engines incorporated in vehicles such as trucks and automobiles.

From the foregoing it will be appreciated that, although specific embodiments of the invention have been described herein for purposes of illustration, various modifications may be made without deviating from the spirit and scope of the invention.

What is claimed is:

1. A method for modeling a parameter of an engine having an operating cycle, the method comprising:

selecting a first number of first functions of a first variable that together represent the values of the parameter over a portion of the operating cycle;

transforming the selected first functions into a second number of second functions of a second variable, each of the second functions having a corresponding coefficient;

forming a neural network by applying an evolutive algorithm to the second functions; and training the neural network by determining values for the coefficients, wherein the parameter comprises a pressure cycle signal.

2. A vehicle, comprising:

an engine having a first operating parameter that is dependent on a control parameter;

a controller coupled to the engine and operable to, receive a value of the first operating parameter, generate a value of the control parameter in response to the received value of the first operating parameter, and provide the generated value of the control parameter to the engine; and a neural network coupled to the controller and operable to, receive the generated value of the control parameter from the controller, generate the value of the first operating parameter in response to the received value of the control parameter, and provide the value of the first operating parameter to the controller, wherein the first operating parameter comprises a pressure cycle signal of the engine.

3. A method for modeling a parameter of an engine having an operating cycle, the method comprising:

selecting a first number of first functions of a first variable that together represent the values of the parameter over a portion of the operating cycle;

transforming the selected first functions into a second number of second functions of a second variable, each of the second functions having a corresponding coefficient;

forming a neural network by applying an evolutive algorithm to the second functions; and training the neural network by determining values for the coefficients, wherein the engine comprises a spark ignition engine.

4. The method of claim 3 wherein the engine comprises a multiple-injection-step spark ignition engine.

5. A soft computing method for establishing the dissipation law of the heat in a diesel common rail engine, in particular for establishing the dissipation mean speed (HRR) of the heat, wherein the system set-up comprises the following steps:

choosing a number of nonlinear functions whereon a dissipation speed signal of the heat (HRR) is decomposed;

applying the Transform to said signal;

implementing a corresponding learning machine by means optimization algorithm; and training and testing said learning machine.

6. A method according to claim 5 wherein the realization of the learning machine provides as inputs the same system inputs ($param_1$, . . . $param_n$) and as outputs the corresponding coefficients strings selected in the previous steps relating to the realization of the learning machine.

7. A method according to claim 5, wherein the final result is a “grey-box” model able to reconstruct in a satisfactory way the mean dissipation speed (HRR) of the heat associated with a given injection strategy and with another engine point.

8. A method according to claim 5 wherein the nonlinear functions whereon a dissipation speed signal of the heat (HRR) is decomposed are Wiebe functions.

9. A method according to claim 5 wherein the learning machine, trained to become the “grey box” model able to reconstruct in a satisfactory way the mean HRR signal associated with a given injection strategy and with another engine working point, is an artificial neural network.

10. A method according to claim 5 wherein the learning machine, trained to become the “grey box” model able to reconstruct in a satisfactory way the mean HRR signal associated with a given injection strategy and with another engine working point, is a fuzzy system.

11. A method according to claim 5 wherein the learning machine, trained to become the “grey box” model able to reconstruct in a satisfactory way the mean HRR signal associated with a given injection strategy and with another engine working point, is a support vector machine.

12. A method according to claim 5 wherein the learning machine, trained to become the “grey box” model able to reconstruct in a satisfactory way the mean HRR signal associated with a given injection strategy and with another engine working point, is a nonlinear filter.

13. A method according to claim 5, wherein said Transform Ψ characterizes the experimental signal of HRR by means of a limited number of parameters as from the following relation:

$$\Psi(HRR(\theta))=(c^k_1, \ldots, c^k_2, c^k_s)\quad k=1,2, \ldots, K \tag{15}$$

where HRR(θ) is the mean HRR signal experimentally acquired for a given multiple fuel injection strategy and for a given engine point whereas ($c^k_1$, . . . , $c^k_s$) with k=1, 2, . . . , K, K are the strings of s coefficients associated by means of the Transform Ψ at the signal at issue.

14. A method according to claim 13, wherein the strings of “optimal” coefficients are determined by means of an analysis of homogeneity taking the principles of the theory of the Tikhonov regularization of non “well-posed” problems as reference.

15. A method according to claim 13 wherein the string of optimal coefficients are determined by means of a clustering analysis.

16. A method according to claim 13, wherein the number s of said coefficients ($c^k_1$, . . . , $c^k_2$, $c^k_s$) is at least ten, and for each Wiebe function, the evolutive algorithm determines the following five parameters: a efficiency parameter of the combustion, m form factor of the chamber, θi and θf start and end angles of the combustion and finally $m_c$ combustible mass; said parameters referring only to the combustion process part being approximated by the Wiebe function at issue.

17. A method according to claim 13, wherein the number s of said coefficients ($c^k_1$, . . . , $c^k_2$, $c^k_s$) is at least ten, and for each Wiebe function, the evolutive algorithm determines the following five parameters: a efficiency parameter of the combustion, m form factor of the chamber, θi and θf start and end angles of the combustion and finally $m_c$ combustible mass; said parameters referring only to the combustion process part being approximated by the Wiebe function at issue.

18. A system to detect abnormal combustion events in a spark ignition and diesel engines based on the method described in claim 5.

19. A passenger vehicle having a system to detect abnormal combustion events according to claim 18.

20. A non-passenger (i.e., truck, commercial vehicles) vehicle having a system to detect abnormal combustion events according to claim 18.

21. A not-passenger (i.e., truck, commercial vehicles) vehicle having a system, that according to claim 18, is able to prevent abnormal engine functioning.

22. A not-passenger (i.e., truck, commercial vehicles) vehicle having a system, that according to claim 18, is able to schedule the optimal maintenance program, so avoiding the vehicle stop due to abnormal combustion events.

* * * * *

UNITED STATES PATENT AND TRADEMARK OFFICE

CERTIFICATE OF CORRECTION

PATENT NO. : 7,369,935 B2
APPLICATION NO. : 11/527012
DATED : May 6, 2008
INVENTOR(S) : Cesario et al.

It is certified that error appears in the above-identified patent and that said Letters Patent is hereby corrected as shown below:

Title Page Item (63) should read --Continuation of application No. 11/142,914 filed on May 31, 2005, now Pat. No. 7,120,533--

Signed and Sealed this

Twenty-eighth Day of October, 2008

JON W. DUDAS
*Director of the United States Patent and Trademark Office*